April 13, 1948.    R. H. NISBET ET AL    2,439,750
AUTOMATIC CONTROL SYSTEM FOR AIRCRAFT
Filed Sept. 17, 1942    3 Sheets-Sheet 1
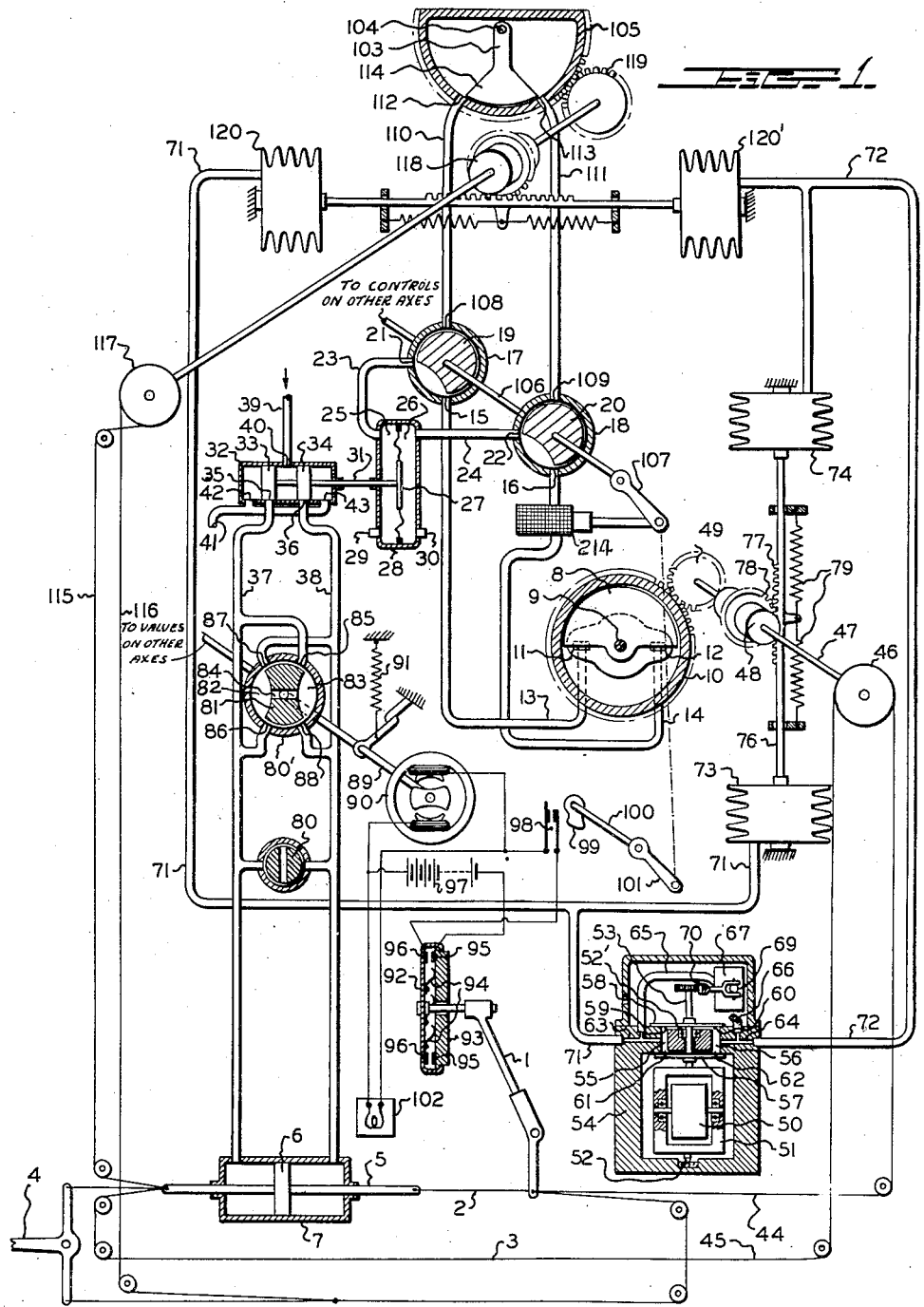
INVENTORS,
ROBERT H. NISBET, and
ARTHUR P. GLENNY;
BY
Herbert N. Thompson
THEIR ATTORNEY.

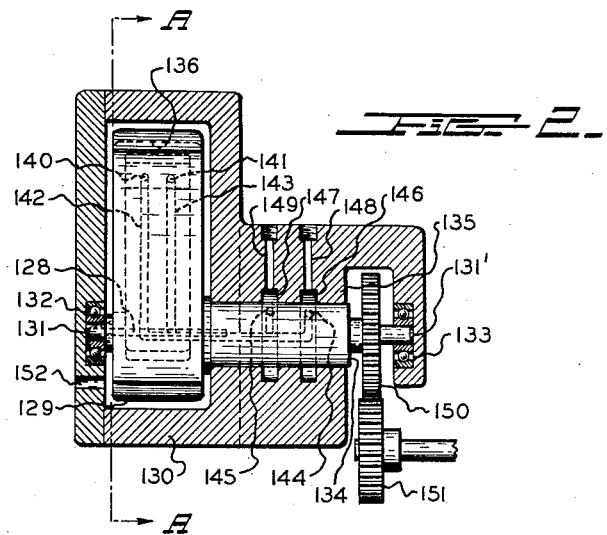
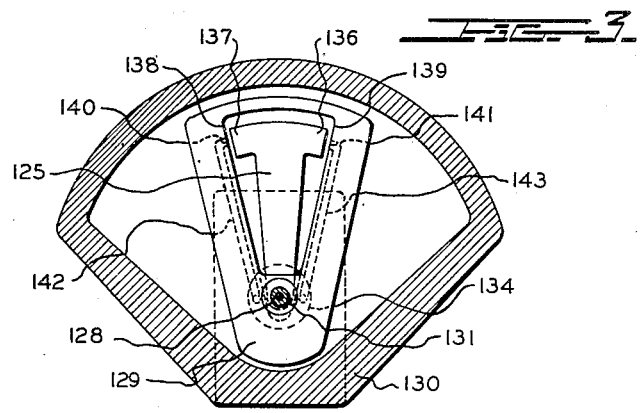

April 13, 1948.   R. H. NISBET ET AL   2,439,750
AUTOMATIC CONTROL SYSTEM FOR AIRCRAFT
Filed Sept. 17, 1942   3 Sheets-Sheet 3

INVENTORS
ROBERT H. NISBET AND
ARTHUR P. GLENNY
BY
ATTORNEY

Patented Apr. 13, 1948

2,439,750

UNITED STATES PATENT OFFICE 2,439,750

AUTOMATIC CONTROL SYSTEM FOR AIRCRAFT

Robert Hayes Nisbet, Stroud, and Arthur Philip Glenny, Amberley, England, assignors to The Sperry Gyroscope Company, Limited, Brentford, England, a British company Application September 17, 1942, Serial No. 458,654
In Great Britain November 22, 1940

Section 1, Public Law 690, August 8, 1946
Patent expires November 22, 1960

20 Claims. (Cl. 244—77)

This invention relates to automatic control systems for aircraft. More particularly it relates to the control of aircraft equipped not only with the usual manual control but also with a so-called automatic pilot for normal automatic control comprising means responsive to changes of course, and to changes of attitude and/or speed, of the craft, and servo-motors and relays whereby the control surfaces of the craft are automatically actuated to control the craft. The problem dealt with by the present invention is that of emergency control to prevent the aircraft from crashing if the pilot loses consciousness during a high speed manœuvre, or is killed as a result of enemy action, or is otherwise mentally or physically incapacitated. Such emergencies may arise during a turn or other manœuvre of the aircraft at an instant at which the aircraft is banked, or is climbing or diving, at a steep angle, and while it is perhaps at a low altitude; and there is therefore a considerable danger that, as a result, the craft may crash before anyone on board can take over the controls from the pilot.

In order to overcome the above mentioned danger the present invention provides an emergency automatic control for aircraft available in conjunction with the usual alternative manual and/or automatic pilot control system, and includes continuously acting means urging automatic change-over from manual to emergency automatic control and positively held out of operation or over-controlled by the pilot during manual control. The automatic controlling mechanism set into action during emergency automatic control is desirably wholly or in part that embodied in the automatic pilot but the control initiating means for emergency automatic control about at least one axis of the craft includes a controlling device other than the primary control instrument of the automatic pilot. This emergency controlling device exerts control over the craft through the servo-motors and relays of the automatic pilot which may be of any standard type, e. g. one of the automatic pilots described in United States Patents Nos. 1,992,970, 2,210,916, 2,210,917, 2,310,954 and application S. N. 259,178, filed March 1, 1939, now Patent No. 2,432,504.

The continuously acting means urging automatic change-over from manual to emergency automatic control involve only a light continuously acting force such as a light spring easily overcome by the pilot during manual control and quite apart from the forces involved in the actual automatic actuation of the control surfaces. Preferably the way in which the pilot during manual control holds the continuously acting means out of operation is by the act of grasping the control wheel, so that, if he releases his grasp of the control wheel, the emergency automatic control automatically takes over control of the aircraft. Preferably, also, an alarm is arranged to indicate when the emergency control is in operation.

There are several reasons why it is desirable to use a controlling device for emergency control of the craft about at least one axis thereof other than the control instrument of the normal automatic pilot.

In the first place as regards azimuth control, at the instant when emergency control is brought into operation, the craft may not be flying in the direction previously set on the automatic pilot; consequently, if the normal automatic control were put into operation, the aircraft would be set into a turn, perhaps at a high rate of turn, towards the heading previously set. This might well be dangerous. We therefore arrange that during the emergency control conditions the rudder at least is not controlled from the normal rudder-controlling instrument, e. g. the directional gyroscope of the normal automatic pilot, but is brought to a central, or nearly central position. For this purpose the rudder may, under emergency control conditions, be freed from all control so that it will find its own position of balance, but we prefer to arrange that the emergency control positively drives the rudder to its central position. To obtain this result the relay controlling the rudder servo-motor is no longer controlled from the directional gyroscope, but solely from means responsive to the position of the rudder, or to the pressure acting on the rudder, so that, whenever the rudder is not central, the servo-motor is actuated in the appropriate direction to drive the rudder towards the central position.

In the second place, as regards control of inclination of the craft, the provision of a primary controlling device other than the instrument used in normal automatic pilot control is desirable for emergency automatic control for the following reason. In a normal automatic pilot system the ailerons and usually also the elevator are controlled from delicate and sensitive gyroscopic instruments, e. g. from a gyro-vertical. However, such gyroscopic instruments are not usually designed to operate when the aircraft is inclined at a large angle, and during abnormal manœuvres the instruments are usually either "caged" or otherwise put out of action; if not, the gyroscopes may be precessed to entirely erroneous positions, and perhaps even damaged, due to their striking against stops that limit their angular movement relative to the craft, or else due to forced precession as a result of movements of the craft when the gyroscopes have lost precession freedon due to a change in the position of the gimbal axes. If this should have happened, the gyroscope can no longer be relied on to maintain level flight. We therefore arrange that, at least in cases where the aircraft may have been inclined at large angles, the ailerons are controlled, under the emergency control according to the invention, from an alternative rugged and coarse controlling instrument which may be a pendulum, or the equivalent, instead of from a delicate and sensitive gyroscopic instrument, the control being arranged to keep the aircraft horizontal about the fore-and-aft axis. This has the advantage that the control instrument used in emergency control is not liable to become displaced as a result of manœuvres carried out by the craft that may have involved large inclination angles and thus to define an incorrect attitude for the craft if the emergency control system is subsequently brought into operation. Similarly the elevator may be controlled from an alternative controlling instrument which may be a pendulum or an airspeed responsive device. If control of the elevator from a pendulum is adopted, the control is arranged to keep the aircraft flying substantially horizontally, while, if control from an air-speed indicator is adopted, this is arranged to adjust the attitude of the craft so as to maintain a predetermined air-speed, as suggested in the prior patent to Elmer A. Sperry, No. 1,368,226, dated February 8, 1929, for Aeroplane stabilizers.

The pendulum controllers for the bank and climb axes may be of any known type responsive to gravity; for example, they may be liquid pendulums; or they may be rollers, or other equivalents of a pendulum. Their movements relative to the craft or to their casings may be damped by viscous damping devices and they may be provided with auxiliary spring constraints centralising them to the craft or to their casings.

A form of pendulum controller particularly suitable for use in the invention is hereinafter described. It comprises an inverted or overslung pendulum mounted with a limited and small amount of freedom of movement relative to a member connected to the aircraft. Such a controller has the disadvantage that it has no position of rest and must therefore produce continuous small oscillations in the craft that it controls. However, it has no natural period of its own with which disturbances or oscillations of the craft can resonate, and it is very sensitive, the slightest deflection from the vertical position being sufficient to cause the pendulum to move to the full extent of the movement permitted by the stops. It is particularly suited to electrical control of the contacting type, as it moves more vigorously into contact with the co-operating contacts and rests with greater pressure against them than does a positive pendulum. When it is used in conjunction with a pneumatic control system, as contemplated by the invention, the ports to be opened or closed by the inverted pendulum may be located in the faces of the stops struck by the pendulum. The air issuing from these ports then cushions the impact and prevents the pendulum from rebounding, while it also has the effect that the control becomes of a more graduated nature.

In the emergency control of the relays from instruments other than the normal control instruments of the automatic pilot, it is still desirable that the movements of a control surface (the ailerons or the elevator), brought about by a relay controlling a servo-motor, should exert a repeat-back or return action on the relay to cut off the action of the servo-motor to prevent the latter from moving the control surface too far. The method of repeat-back used in emergency control is preferably the same as that used in the normal automatic pilot.

One form of the invention adapted for use as an auxiliary emergency control in conjunction with an automatic pilot of the general type disclosed in United States Patent 1,992,970 dated March 5, 1935 will now be described with reference to the accompanying drawings in which:

Fig. 1 is a schematic diagram of automatic control arrangements for actuating one of the control surfaces of an aircraft to control the aircraft about one axis, inclusive of means according to the invention for automatically engaging the automatic control means in an emergency.

Fig. 2 is a view partly in section of a special form of control pendulum according to the invention which may be used in the system of Fig. 1 or in other types of control system that need to employ a gravity-responsive controller.

Fig. 3 is a sectional view of the control pendulum of Fig. 2 taken on the line A—A of Fig. 2.

Figure 4:
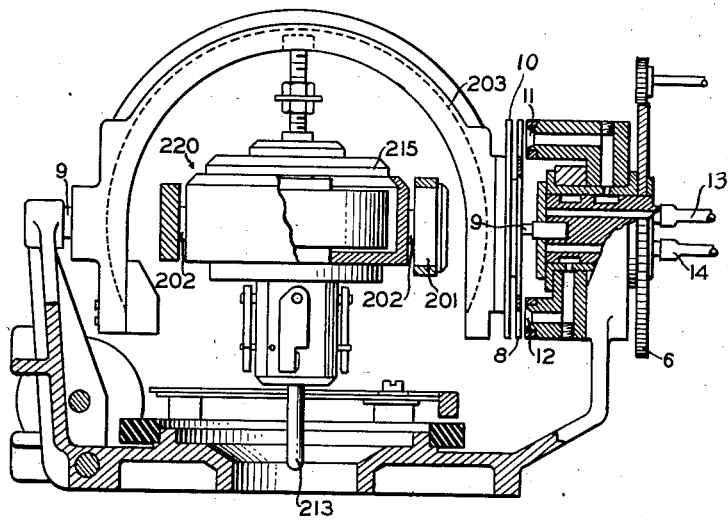
Fig. 4 is a front elevation, partly in section, of the gyro-vertical used for stabilizing the craft against roll and pitch.

In Fig. 1, I is the control column, which is connected through control cables 2, 3 to actuate the elevator 4 of the craft. In series with the cable 2 there is connected the piston rod 5 and piston 6 of a servo-motor which, when suitably controlled, exerts automatic control of the elevator and therefore of the attitude of the craft. The servo-motor may be controlled solely from a "displacement" signal, but in Fig. 1 is shown as controlled from the combination of a "displacement" signal and a "rate" signal, the former being obtained from a vertical axis gyroscope or other standard of position and the latter from a rate-of-turn gyroscope. The control arrangements for exerting control effects from the vertical axis gyroscope are generally in accordance with those illustrated and described in United States Patent 1,992,970 dated March 5, 1935, with modifications to allow of part control from the rate-of-turn gyroscope and to include special switch arrangements constituting features of the present invention.

The vertical-axis controlling gyroscope 220 (Fig. 5) serves to stabilize a semicircular cut-off plate 8 about a horizontal axis 9 lying transversely in the craft and constituting one part of a two-part pick-off or controller, and a co-operating member 10 constituting the second part of said pick-off is rotatably mounted about the same axis 9 and carries ports 11, 12 in the form of narrow rectangular slots which are normally half-covered by the straight edge of the semicircular cut-off plate 8. The ports 11, 12 are in communication with pipes 13, 14 respectively, through passages, not shown, which maintain such communication during any rotational displacements to which the member 10 may be subjected. The pipes 13, 14 lead to ports 15, 16 in rotary valve chambers 17, 18; as shown, the rotary elements 19, 20 of the valves have cut-away segments which normally put the ports 15, 16 into communication with ports 21, 22 respectively, from which pipes 23, 24 lead to two compartments 25, 26 in a diaphragm chamber 28 separated by the diaphragm 27. The two compartments 25, 26 communicate with the atmosphere through very restricted openings 29, 30.

The gyroscope, the cut-off plate 8 attached to it, and the co-operating ported member 10, are all located inside the instrument case (not shown) of the gyroscope, which is closed to the atmosphere and has its interior maintained at a low pressure by some form of suction pump. Consequently air is drawn in through the openings 29, 30, through the compartments 25, 26, pipes 23, 24, 13, 14 and ports 11, 12 into the interior of the casing of the gyroscope. When the aircraft is horizontal fore and aft, the ports 11 and 12 are equally open and equal volumes of air flow through them; consequently the pressures in the compartments 25, 26 on either side of the diaphragm 27 are equal and the diaphragm remains stationary. However, if the craft should pitch upwards, taking the ported member 10 with it, the disc 8 covers port 11 and uncovers port 12, thus upsetting the balance of the air flow through the ports. As a result the pressure in compartment 25 of the diaphragm chamber 28 increases while that in compartment 26 decreases; the diaphragm 27 therefore moves to the right.

To the diaphragm 27 is attached the piston rod 31 of a piston type relay valve 32. The pistons 33, 34 of this relay valve normally cover ports 35, 36 from which pipes 37, 38 lead to opposite ends of the servo-motor 7. Hydraulic fluid under pressure is supplied to the relay valve through a pipe 39 and port 40 in the wall of the valve cylinder lying midway between the normal positions of the pistons 33, 34, and an exhaust pipe 41 is connected to ports 42, 43 in the walls of the valve cylinder beyond the ends of the pistons 33, 34.

When the diaphragm 27 moves to the right as the result of an upward pitch of the craft it takes with it the pistons 33, 34, and oil under pressure is thereby admitted into the right-hand end of the servo-motor 7 through pipe 39, ports 40, 36, and pipe 38. Piston 6 of the servo-motor is consequently forced to the left expelling oil from the left-hand end of the servo-motor cylinder through pipe 37, ports 35, 42, and pipe 41 to the sump. The movement of the servo-motor to the left produces a downward deflection of the elevator by means of the cables 2, 3. This checks the upward pitch. Conversely, if the craft were to pitch downwards, the elevator would be displaced upwards to check the pitch movement.

The movement of the servo-motor 6, and consequently the movement of the elevator 4, in this automatic control system is limited by the fact that the servo-motor is connected to cables 44, 45, which are connected to a pulley 46. The shaft 47 of this pulley is connected through a differential 48 to a gear wheel 49 meshing with teeth on the ported member 10; it follows that movement of the servo-motor brings about a movement of the ported member 10. The connections are such that the ported member 10 is caused to turn on the craft about the axis 9 until it resumes a position of alignment with the cut-off plate 8 attached to the gyroscope. In this way it is ensured that the elevator moves only through an angle proportional to the pitch of the craft.

By means of the differential 48 auxiliary control movements may be introduced. In the arrangement shown in Fig. 1 a control term proportional to the rate of pitch is introduced in this way. For this purpose a gyroscope is employed having a rotor 50 spinning about a fore-and-aft axis in a gimbal ring 51, which is mounted by means of bearings 52, 52' for oscillation about a vertical axis. The casing 54 of the gyroscope is closed against the atmosphere and a vacuum is maintained inside it by means of a suitable suction pump. A nozzle (not shown) admits air through the walls of the instrument case to spin the rotor. Air is also admitted through the lid of the instrument casing by two passages 55, 56, on opposite sides of the vertical axis of support of the gimbal ring. The upstanding shaft 53 of the gimbal ring 51 passes through the lid of the casing and there are attached to it two cut-off plates 57, 58, the latter outside the instrument casing and the former inside. These cut-off plates 57, 58, are similar to the cut-off plate 8 and are disposed with respect to the passages 55, 56, in the same manner as the cut-off plate 8 is disposed with respect to the ports 11, 12. However, the two semicircular plates 57, 58 are arranged on opposite sides of the plane of the gimbal ring 51, so that in plan view they form a complete circle. The passages 55, 56, are terminated at their upper ends by narrow rectangular ports 59, 60 and at their lower ends by similar ports 61, 62. The result is that, if the gimbal ring 51 turns about the axis of its bearings 52, 52' in one direction, port 59 is closed and port 60 is opened, whereas port 61 is opened and port 62 is closed. Thus passage 55 is put into full communication with the interior of the instrument, and passage 56 is put into full communication with the atmosphere. If the gimbal ring 51 were to turn in the opposite direction, the reverse state of affairs would be obtained. The pressures in the passages 55, 56, are communicated through passages 63, 64, and pipes 65, 66, to a pair of bellows, so that the difference in pressure between the passages 55, 56, is made effective to move a rod 69 connecting these bellows. The pipe 65 is shown connected to one of a pair of oppositely acting bellows 67. The pipe 66 is connected to the opposite bellows, not shown. The rod 69 extending axially between the two bellows engages with a rod 70 connected to the gimbal ring shaft 53.

No centralising spring is employed on the gimbal ring 51; nevertheless, as will be seen, the gyroscope acts as a rate-of-turn gyro. If the craft begins to turn about the axis to which the device is responsive (in this case the athwartship axis) the gimbal ring 51 begins to precess about its pivot axis, but this precessional movement is soon checked because it results in unbalancing the pressures in the passages 55, 56, and the consequent difference of pressure in these passages is applied to the bellows 67, to prevent further movement of the gimbal ring. The parts are so proportioned that, during a continuous turn of the craft at any rate within the range of values for which the device is intended to be effective, the gimbal ring 51 can never turn far enough to ensure that the ports 59, 62, are completely closed and the ports 60, 61 are completely open, or vice-versa. It follows that the difference of pressure developed in the pair of bellows 67, and therefore in the passages 55, 56, is automatically regulated to equal the precessional torque of the gyroscope and is thus directly proportional to the rate of turn of the craft. From this it follows that the differential signal pressure developed by the gyro is more nearly proportional to the rate of turn through a large variation in rate than would be the case if centralizing springs were employed, because the precessional force developed by the gyro decreases when the gyro is precessed through a substantial angle away from its neutral position; i. e., the force is not truly linear in proportion to the angle of precession. The pressure developed in the passages 55, 56, is also applied through pipes 71, 72 to a differential bellows 73, 74, to produce axial movement of a rod 76. This movement is applied through rack and pinion gearing 77, 78, to the differential 48. A centralising spring 79 acts on the rod 76 so that the movement of this rod is proportional to the difference of pressure acting on the bellows 73, 74, and therefore to the rate of turn of the craft. This construction possesses the further advantage that the passages 65 and 66 which are tapped into the main passages 71 and 72 leading from the pickup ports to the main bellows 73, 74, 120, 120', may be restricted, thereby introducing a delay in the centralizing of the gyroscope, thus causing a larger signal upon change of rate than is finally reached at a steady rate, thus introducing an angular acceleration term.

If desired an indicator can be attached to the rod 76 to indicate the rate of turn of the craft. Clearly also a turn-responsive gyroscope of the kind described may be used not only in the present control system but in connection with any other control system in which it is required to use a pressure or movement proportional to a function of the rate of turn of a craft or other moving platform. Alternatively such a gyroscope may be used as a mere indicator of rate of turn.

As in Fig. 1 the movement of the rod 76 is superimposed by differential 48 on the movement of pulley 46 to actuate the follow-up ported member 10, the servo-motor 7 is now controlled not merely by the displacement of the craft relative to the gyroscope but by the sum of two control terms, one proportional to this displacement and the other proportional to the displacement of the rod 76, i. e. proportional to the rate of turn of the craft. The system is therefore one in which control of the elevator depends partly on displacement and partly on rate of displacement. As is well known a control of this type is advantageous in rapidly damping out any tendency of the craft to oscillate.

When it is desired to effect manual control of the elevator from the control column 1 the pilot may turn the valve cock 80, which is connected across the supply pipes 37, 38 leading to the servo-motor 7. It is then possible for the piston 6 of the servo-motor to be actuated from the control column 1 without any appreciable opposition by the oil in the servo-motor to movements of the piston 6. In order to carry out the present invention an additional or alternative by-pass valve 80' is provided across the supply pipes 37, 38 leading to the servo-motor. As shown, this valve is of the rotary type. It consists of a cylinder containing a cylindrical rotary member 81 having two diametrically opposite cut-away sectors 82, 83, these sectors being in communication with each other by means of a passage 84 passing through the rotary member. The supply pipe 37 communicates with two diametrically opposite ports 85, 86, and the pipe 38 communicates with a second pair of diametrically opposite ports 87, 88. In the position shown in the drawings the cut-away sectors 82, 83 do not interconnect the pair of ports 85, 86, with the pair 87, 88, so that the servo-motor is not by-passed. However, it can be seen that if the rotary member 81 is turned through approximately 90° it will put the port 85 into communication with port 87, and port 86 into communication with port 88, thus serving to by-pass the servo-motor. The rotary member 81 is solid with the shaft 89 of a rotary magnet 90 whose construction is somewhat similar to that of a D. C. motor. A spring 91 acts on the shaft 89 to maintain the rotary valve member 81 in the angular position shown. However, if the windings of the rotary magnet 90 are energised, the shaft turns through 90° thus causing the valve 80' to by-pass the servo-motor.

At the head of the control column 1 there is mounted a control wheel 92. On the underside of this wheel there is mounted a ring 93 which has freedom of movement in a vertical direction through a small distance; the ring is spaced from the wheel 92 through the full extent of this freedom of movement by means of a series of springs 94 arranged round the circumference of the wheel 92 and ring 93. When the pilot grasps the wheel he also grasps the ring 93 and presses the ring towards the wheel, thereby causing at least one of a number of contacts 95 carried on the ring to make contact with a corresponding contact 96 carried on the underside of the wheel 92. The contacts 95 are connected together so that the gaps between the contacts 95 and the corresponding contacts 96 can be considered to form a single contact gap which will be closed whenever the pilot grasps the control wheel 92 at any point connected round its circumference. This contact gap is in series with the winding of the rotary magnet 90 in a circuit including a source of current, such as battery 97, and a second contact device 98. The contact device 98 is adapted to be closed by a cam 99 when the cam shaft 100 on which this cam is mounted is turned by means of a handle 101. This handle we shall refer to as the "emergency switch."

When the emergency switch 101 is in the right-hand position shown in Fig. 1, contact 98 is broken and therefore the rotary magnet 90 cannot be energised. The automatic control system is then completely effective. However, if the emergency switch 101 is moved to the left hand, or emergency, position, which in practice is done by the pilot whenever he suspects or becomes aware of the approach of hostile aircraft or is about to undertake acrobatic manœuvres, contact 98 is made, with the result that the pilot has only to grasp the control wheel 92 to cause rotary magnet 90 to be energised and thus to ensure that the servo-motor 7 is by-passed. The pilot may then take manual control of the elevator 4 by actuating the control column, and he can at once transfer control back to the automatic control system by simply releasing his grasp of the control wheel 92. When he does this, the springs 94 move the ring 93 away from the wheel 92, breaking all the contacts 95 from the co-operating contacts 96; the rotary magnet 90 is therefore no longer energised, and the spring 91 returns the by-pass valve to the position shown in the drawings in which the servo-motor is no longer by-passed; the automatic control system therefore at once becomes effective.

It is clear that, if the pilot should suddenly become incapacitated, through enemy action or otherwise, the same sequence of events will take place; the pilot will release his grasp of the control wheel 92 and the automatic control system will take over control of the craft to fly it in whatever attitude had previously been set on the control gyroscope. The fact that the ring 93 is on the under-side of the control wheel 92 ensures that, even if the pilot were to fall forward on to the control wheel 92, he could not thereby accidentally close the contacts 95, 96 to hold the automatic control system out of action.

Preferably it is arranged that a warning signal is given to other members of the crew whenever the pilot releases his grip of the control wheel 92 i. e. whenever the emergency automatic control system takes over control. For this purpose a warning device, such as a lamp 102, is connected in parallel with the windings of rotary magnet 99, so that it is energised when the solenoid is energised.

It is plain that the invention can be put into effect with any type of automatic control system. For example the automatic control system may be one in which the elevator is controlled from an instrument responsive to the air-speed of the craft instead of one responsive to the inclination and the rate of change of inclination of the craft as in the system of Fig. 1. Also the auxiliary rate-of-turn gyroscope 50, and the ports actuated from it may be omitted, so that the control becomes a pure inclination control. However, the presence of the rate of turn gyroscope in the system has the advantage of ensuring that, when the pilot releases the wheel 92 and the automatic control system takes over control, to swing the craft in most cases into a different attitude, the change to the new attitude does not take place too violently.

In most automatic control systems that use gyroscopes as controlling instruments the gyroscopes are apt to be seriously disturbed if the aircraft carries out manœuvres in which it becomes inclined at a large angle to the horizontal, whether because the angular freedom of movement of the rotor case or gimbal ring of the gyroscope is limited or because at large angles of inclination of the aircraft the gyroscope virtually loses one of its degrees of freedom. As a result, the gyroscope ceases for a time to be a reliable reference for automatic control. If the automatic control system were to be engaged under conditions where the gyroscope had been disturbed, the craft would be automatically controlled to take up an inclined attitude instead of a horizontal one, which might be very dangerous. It is therefore arranged that the automatic control that is automatically brought into operation if the pilot becomes incapacitated is carried out from controlling instruments other than the gyroscopes used in normal automatic control. One such arrangement will now be described. It comprises, as shown in Fig. 1, a pendulum 103 pivoted about an axis 104 lying transversely in the craft, which can be brought into operation, as an alternative to the vertical axis gyroscope, to control the elevator 4. The pendulum 103 lies inside an enclosing casing 105 pivoted about the same axis 104 as the pendulum; this casing is closed against the atmosphere and its interior is maintained at a low pressure by means of a suitable vacuum pump. The change-over from control by the gyroscope to control by the pendulum is brought about by the rotary valves 17, 18.

The rotary elements 19, 20, of these valves are mounted on a common shaft 106 which may be actuated from a control handle 107. In the normal position of this handle the rotary elements 19, 20, are in the positions shown in Fig. 1, but, if the handle 107 is turned through approximately 90° to the left into the "secondary control" position, the rotary elements 19, 20, will take up positions in which the ports 21, 22, leading to the diaphragm chamber 28 are put into communication with ports 108, 109 instead of into communication with ports 15, 16. Ports 108, 109, communicate via pipes 110, 111, with ports 112, 113 in the lower wall of the casing 105. The inner surface of this wall is in the form of a cylinder having as axis the axis 104 of rotation of the casing 105 and of the pendulum 103.

The lower part or bob 114 of the pendulum 103 extends over an arc of the interior cylindrical surface of the casing 105, and is of cylindrical form over this arc, so that a very small radial clearance exists between the bob 114 of the pendulum and the inner surface of the casing, this clearance being substantially constant if the pendulum and casing turn relatively to each other about the axis 104. The arcuate length of the bob 114 is equal to the distance between the ports 112, 113, so that in the normal relative position of the pendulum and the casing the ports 112, 113 are both bisected by the knife edges that form the extremities of the arcuate extent of the bob 114.

The ports 112, 113, are thus related to the bob 114 of the pendulum 103 in the same manner as are the ports 11, 12 to the cut-off plate 8 of the gyroscope. In the "secondary" control position of handle 107 the pressures in the two sides 25 and 26 of the diaphragm chamber 28 are therefore controlled by the inclination of the craft relative to the pendulum 103 in the same manner as, during normal control, they are controlled by the inclination of the craft relative to the gyroscope. In fact, the ported casing 105 acts as a pick-off member for the pendulum in the same way as the ported member 10 acts as a pick-off member for the gyroscope.

It follows that by operation of the changeover valves 19, 20, by means of the handle 107 the pendulum becomes a secondary controlling instrument alternative to the gyroscope for automatically regulating the inclination of the craft. The control is exerted through the same relay arrangements (diaphragm 27 and relay valve 32) and through the same servo-motor 7 as are used in the primary automatic control system.

In the secondary control system it is desirable to ensure that the pick-off member 105 is caused to follow up the primary controlling instrument 103 in the same way as the pick-off member 10 follows up the cut-off plate 8 under the control of the repeat-back cables 44, 45. For this reason repeat-back cables 115, 116, connected to the servo-motor, are employed to turn pulley 117 which is connected through differential 118 and gearing 119 to turn the casing 105 to follow the movements of the pendulum 103 relative to the craft. Also it is desirable to include in the secondary control system the rate-of-pitch term provided by the rate-of-turn gyroscope 50 in the control of the elevator. For this purpose the differential 118 is made to serve the same purpose as differential 48; it superimposes in the followback connection from servo-motor 7 to the pendulum casing 105 a movement applied by a pair of bellows 120, 120' which respond to the difference of pressure picked off from the rate-of-turn gyroscope 50. In this way a control term proportional to the rate-of-turn of the craft is introduced into the secondary control system as well as into the normal control system.

In a modification of the system shown in Fig. 1 the two handles 101, 107 are linked together, as represented by the dash-dot line connecting handles 101 and 107, or are replaced by a single handle operating both of the shafts 100 and 106. As before, when the handle is moved from the normal to the emergency position the system is rendered ready to take over automatic control when the pilot releases his grasp of the control wheel 92, but in this modification the control system that takes over is always the secondary system, i. e. the one in which the primary controlling instrument is the pendulum 103 and not the gyroscope.

Figure 5:
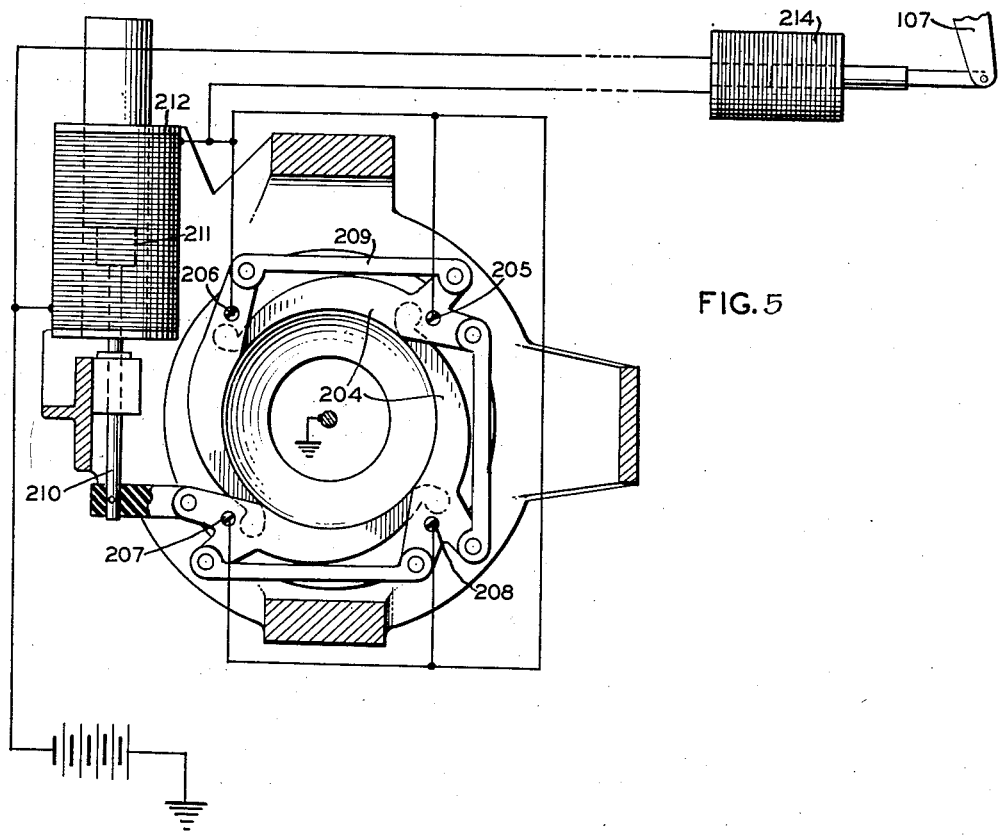
Fig. 5 is a section taken approximately on line 6—6 of Fig. 4, looking downwardly.

In a further modification the change-over handle 107 is replaced by automatic means for actuating the shaft 106 if the gyroscope of the normal automatic control system should be disturbed. In United States Patent No. 2,280,116 dated Apr. 21, 1942 there is described a gyro-horizon in which means are included for automatically centralising and caging the gyroscope if excessive inclination of the craft relative to the gyroscope should occur, such excessive inclination serving to operate an electric contact which energises a solenoid to cage the gyroscope. Such a gyroscope may be used as the controlling gyroscope in an automatic control system similar to Fig. 1, as shown in Figs. 4 and 5. In Fig. 4 the gyro 220 is shown as universally mounted by means of gimbal ring 201, which is pivoted fore and aft on the craft and which pivotally supports the gyro casing 215 on transverse axis 202. The roll controller about the fore and aft axis is not shown, being behind the gyroscope, but the pitch controller is shown as actuated from a bail or loop 203 pivoted on transverse axis 9—9 parallel to and normally in line with axis 202, the cutoff plate 8 being shown secured to the bail. A caging means is shown on the gyroscope in the form of a plurality of curved fingers 204 spaced about the vertical axis of the gyroscope and each pivoted on pivots 205, 206, 207 and 208, respectively. Links 209 connect the fingers so that they are all operated together, and one finger is connected through connecting rod 210 to the core 211 of a solenoid 212. The fingers cooperate with a pin 213 extending downwardly from the bottom of the gyroscope, so that when the fingers are closed together, the pin is centralized and the gyroscope locked in a normally vertical position with respect to the craft. An electric circuit is arranged between the pin 213 and the fingers so that whenever the fingers contact the pin, caused by relative inclination of the gyroscope and craft, a circuit is closed through the solenoid which closes the fingers to cage the gyroscope. It can then be readily arranged that the contact that energises the caging solenoid 212 should also energise another solenoid 214 or motor to rotate shaft 106. This has the advantage that when the handle 101 is put into the emergency position and the pilot releases his grasp of wheel 90 the normal automatic control system automatically takes over control to control the craft from the gyroscope unless the gyroscope has been disturbed through excessive inclination of the shaft, in which case the gyroscope becomes caged automatically. In the latter case, or if the gyroscope has been caged for any other reason, when the pilot releases his grasp of wheel 92 control of the craft is transferred to the pendulum instead of to the gyroscope.

It is evident that, if desired, the rotary valve 80' may be replaced by a valve of the piston type, in which case the rotary magnet device 90 may be replaced by a solenoid plunger connected to actuate the piston; similarly the rotary valves 19, 20, may be replaced by valves of piston type.

The arrangements for controlling the ailerons are generally similar to those shown in Fig. 1 for controlling the elevator. However, the method of controlling the rudder involves some differences. In this arrangement, when the automatic control system takes over control the system operates to bring the rudder to a central position, i. e., the rudder.

In an alternative emergency control system the rudder may be left free, or "floating." To secure this result, the only by-pass valve provided for the rudder servo-motor is a manually operated one, corresponding to the by-pass valve 80 so that the pilot has to operate this valve to by-pass the rudder servo-motor when he wishes to take manual control of the craft. When the pilot releases his grasp of the control wheel 92, the rudder servo-motor then remains by-passed, whereas the elevator and ailerons are put under automatic control.

It is evident from the foregoing that either two or three servo-motors must simultaneously be brought into emergency operation when the pilot releases his grasp of the control wheel 92. For this reason the by-pass valves 80' for the several servo-motors to be brought into operation are preferably interconnected so as to be operated simultaneously by the same electro-magnetic device 90. Similarly, the change-over pneumatic valves 17, 18, in the air-pressure control lines leading to the different diaphragm chambers, such as 28, for controlling the craft about its different principal axes, may be ganged together for operation by a single operating member such as the handle 107.

Figs. 2 and 3 illustrate a novel type of control pendulum which may be used to replace the control pendulum 103 in the system of Fig. 1. This control pendulum 125 is an inverted or overslung rigid pendulum; it is supported on pivots on an axis 128 in a follow-up support or casing 129, which is itself mounted for rotation about the same axis 128 in a stationary outer casing 130. For this purpose the inner follow-up casing 129 is provided with a shaft 134 having reduced ends or trunnions 131, 131' supported in bearings 132 and 133 in the stationary outer casing. The shaft 134, solid with the inner casing 129, turns with a very small clearance inside a bushing 135 forming an extension of the outer casing 130.

The pendulum 125 is carried in a recess 136 in the inner casing 129; it is provided with a bob 137 normally carried above the pivot axis 128, this bob having a very small freedom of movement between the faces or walls 138, 139 of the recess, so that the pendulum has a very small freedom of angular movement relative to the casing 129. It is clear that the pendulum 125 is unstable, so that, if it becomes inclined to the slightest extent in either direction from the vertical position shown in Fig. 3, it will fall over in that direction and rest against either the wall 138 or the wall 139, thereby closing either the port 140 in the wall 138 or the port 141 in the wall 139. The ports 140, 141 are connected by channels 142, 143, respectively, to axially separated ports 144, 145 on the surface of the shaft 134, which open into circumferential channels 146, 147 in the outer casing 130. Channels 146, 147 are connected to channels 148, 149 in the outer casing 130, which serve as the means by which a pressure-responsive device, such as the diaphragm chamber 28 of Fig. 1, may be connected to be operated by the pendulum; in other words, if the pendulum of Figs. 2 and 3 were to be used in the system of Fig. 1 to replace the pendulum 103, the pipes 110, 111 of Fig. 1 would be connected to the channels 148, 149. The interior, or follow-up, casing 129 is adapted to be driven round the axis 128 by means of a gear wheel 150 secured to pivot shaft 131' and adapted to be driven by a second gear 151 which thus corresponds to the gear 119 of Fig. 1.

In operation, the interior of casing 130 is maintained at reduced pressure by means of a suitable vacuum pump, which may withdraw air through any suitable exhaust orifice, such as orifice 152. The air enters the arrangement through the channels 148, 149 and passes into the interior casing 129 through the ports 144, 145 which are supplied from the circular channels 146, 147. The air then flows out of the interior casing 129 through the ports 140, 141 into the outer casing 130, from which it is withdrawn through orifice 152 by means of the vacuum pump. Clearly the amounts of air flowing into the system through the two channels 148, 149 will be determined by the extent to which the ports 140, 141 are closed by the bob of the pendulum. For example, if the pendulum falls over to the left, port 140 will be substantially closed and port 141 will be opened; very little air will then flow in through the channel 148, whereas a considerable volume will flow through port 149. The pendulum thus serves to unbalance the air flow in the two channels 148, 149 in the same manner as the pendulum 103 of Fig. 1 serves to unbalance the air flow through the ports 112, 113. Clearly, therefore, the inverted pendulum 125 can be used to replace the pendulum 103 of Fig. 1. It should be noted that, when this is done, the follow-back connections 115, 116 from the elevator servo-motor 7 should be so connected as to turn the casing 129 in the direction to restore the pendulum 125 towards the vertical position.

The inverted pendulum 125 is used in Fig. 1 to control air ports to provide an air pressure signal for control purposes; such a pendulum can equally well be used for operating an electrical contact in an electrical control system. Positive control pendulums, such as are normally used in gravity-responsive control systems, have disadvantages, in that they tend to oscillate about their axis of support; this tends to produce a similar oscillation in the craft or other system controlled by the pendulum. Furthermore, in the case where the pendulum actuates electric contacts, the tendency of the pendulum to oscillate about its pivot axis is apt to produce bad sparking at the contacts. When an inverted pendulum is used both these defects are avoided, as the pendulum is aperiodic.

The invention has so far been described with particular reference to an automatic pilot operating generally in accordance with the principles disclosed in United States Patent No. 1,992,970 dated March 5, 1935. It can also be used in association with other types of automatic pilot. For example, in United States Patents Nos. 2,210,917 dated Aug. 13, 1940 and 2,210,916 dated Aug. 13, 1940 there are described automatic control systems for aircraft in which follow-back connections, such as the cable connections 44, 45 of Fig. 1, interconnecting the servo-motor and the pick-off device at the gyroscope, are not employed. This is due to the fact that the relay valve is designed differently from the relay valve 32 of Fig. 1 so as to incorporate in itself the necessary means for limiting the movement of the servo-motor resulting from a pressure signal applied from the gyroscope or other controlling instrument. If the invention is applied to an automatic control system of the type shown in United States Patents Nos. 2,210,917 and 2,210,916 control may be transferred in an emergency in accordance with the invention to a control pendulum differing from that shown in Fig. 1, and the follow-back connections 115, 116 may be dispensed with. The modified control pendulum for this purpose may have its pick-off ports 112, 113 skewed relative to the cut-off edges of the bob 114 of the pendulum 103, so that, as the pendulum moves through progressively increasing angles relatively to the casing 105, one of the ports 112, 113 is progressively opened to a greater extent, while the other is progressively shut off—at least up to a predetermined angle of displacement of the pendulum from its normal position relative to the casing. In this way the difference of pressure picked off from the pendulum can be made proportional to the tilt of the craft up to a predetermined limited angle, which is a satisfactory method of control in automatic control systems of the kind referred to.

What we claim is:

1. A system of control for aircraft comprising an automatic pilot having pendulous controlling means therefore and gyro-vertical primary controlling means, said gyro-vertical controlling means including a rotor frame, caging means operative when said aircraft departs from a selected attitude by more than a predetermined tilt for caging said frame, and means brought into action by operation of said caging means for transferring control of said automatic pilot from said gyro-vertical to said pendulous controlling means.

2. A system of control for aircraft comprising an automatic pilot having rugged, coarse controlling means therefor and delicate, sensitive primary controlling means normally movable relative to said pilot, protective means operative when said aircraft departs from a selected flight path by more than a predetermined angular deviation for locking said delicate, sensitive primary controlling means, and means for transferring control of said aircraft from said delicate controlling means to said rugged controlling means upon operation of said locking means.

3. A system of control for aircraft as claimed in claim 2, in which said last-named means includes means automatically responsive to relative tilt of said craft and primary control means exceeding a predetermined norm for transferring control of said pilot from said delicate to said rugged controlling means.

4. A control system for aircraft comprising normally operative gyroscopic automatic piloting means, normally inoperative flight-levelling means for urging said aircraft to assume a predetermined attitude by movement about at least one axis of motion, and means operative upon relative tile between said gyroscope and aircraft of more than a predetermined angle for transferring control of said aircraft from said normally operative automatic piloting means to said normally inoperative flight-levelling means.

5. A control system for aircraft comprising automatic piloting means including a gyro-vertical with a rotor frame and caging means operative when said aircraft departs from an attitude by more than a predetermined tilt for caging said frame, pendulously controlled levelling means for urging said aircraft to assume a predetermined attitude about at least one axis of motion, and means brought into action by operation of said caging means for transferring control of said aircraft from said gyro-vertical to said levelling means.

6. A system of control for controlling the attitude of aircraft, comprising automatic means for controlling said aircraft under abnormal flight conditions, said automatic means including a fluid-flow control device comprising a pivotal mounting, an overslung casing adjustable on said mounting, fluid conducting ports in said casing, and an overslung freely movable coaxially pivoted pendulum within said casing operative to close one of said ports when said overslung pendulum is displaced from an equilibrium position directly above said pivotal mounting.

7. In an automatic pilot for aircraft, a fluid-flow control device comprising a pivotal mounting, an overslung casing adjustable on said mounting, fluid conducting ports in said casing, an overslung, freely movable coaxially pivoted pendulum within said casing operative to close one of said ports when said overslung pendulum is displaced from an equilibrium position directly above said pivotal mounting, and differential pressure means for controlling the attitude of the craft subject to the resulting variation in pressure at said ports.

8. In an automatic pilot for aircraft, a fluid-flow control device comprising a pivotal mounting, an overslung casing adjustable on said mounting, oppositely facing fluid-conducting ports in said casing, an overslung pendulum coaxially pivoted and freely movable within said casing, said pendulum having a portion free to swing on an arc passing through the centers of the faces of said fluid-conducting ports and operative to close one of said ports when said pendulum is displaced from an equilibrium position directly above said pivotal mounting, and differential pressure means for controlling the attitude of the craft subject to the resulting variation in pressure at said ports.

9. In an automatic pilot for aircraft, a fluid-flow control device comprising a pivotal mounting, an overslung casing adjustable on said mounting, oppositely facing fluid conducting ports in said casing, an overslung coaxially pivoted pendulum movable within limits set by said casing and operative to close one of said oppositely facing fluid conducting ports when said pendulum is displaced from an equilibrium position directly above said pivotal mounting, and differential pressure means for controlling the attitude of the craft subject to the resulting variation in pressure at said ports.

10. In a crash preventing means for aircraft having both manual control and automatic pilot control including servo means operable about each axis of the craft, a directional gyroscope and rate-of-turn detecting means for normal azimuth control, and means for bringing the aircraft out of a spin, including means for throwing the rudder servo means under the control of said rate-of-turn detecting means.

11. A crash preventing means as claimed in claim 10, also having a gyro-vertical for normal stability control, an auxiliary pendulum, and means for transferring the control from the gyro-vertical to the auxiliary pendulum in an emergency.

12. A control system for aircraft, comprising a normally operable automatic pilot including a gyro-vertical of limited range of operation for urging said craft to assume a predetermined attitude in roll and pitch within such range, a normally inoperable emergency control means for said automatic pilot for causing said pilot to urge said craft to assume a level flight attitude, and means at the gyro-vertical responsive to tilt of the craft beyond said range of operation of the gyro-vertical for transferring control of said pilot from said gyro-vertical to said emergency control means.

13. A control system for aircraft, comprising an automatic pilot having a gyroscope and servo motor and adapted to maintain said craft in a horizontal attitude, emergency control means including an alternative pendulous device and said servo motor for also maintaining said craft in a horizontal attitude, a third controller of the manual type including a changeover trip, said third controller being adapted, when grasped, to render both said automatic pilot and emergency control inoperative and to place said emergency control and servo motor in a standby condition, thereby rendering said craft responsive to said controller, and means responsive to release of said trip by said pilot, for transferring control of said craft to said emergency control means.

14. In an automatic pilot for aircraft, a standard of position, a two-part pick-off thereat for controlling the attitude of the craft about a major axis, an angular rate gyroscope, a pick-off thereat giving a signal responsive to the rate of turn of the craft about said axis and air pressure means responsive to the magnitude and direction of said signal for altering the relation of the parts of the pick-off at the standard of position.

15. In an automatic recovery pilot for aircraft, a directional gyroscope and rate-of-turn gyroscope for controlling the rudder to guide the craft in azimuth, a gyro-vertical and a rate-of-turn gyroscope for governing the ailerons to control attitude of the craft in roll, a rate-of-turn gyroscope to govern the elevator to control the attitude of the craft in pitch in combination with said gyro-vertical, and emergency means for recovering the craft under unusual conditions, including means for severing the control of said directional gyroscope and said gyro-vertical but allowing all three rate-of-turn gyroscopes to remain in control of their respective control surfaces.

16. In an automatic recovery pilot for aircraft, a gyroscopic standard of position, a two-part pick-off thereat for controlling the attitude of the craft about a major axis, an angular rate gyroscope, a pick-off thereat giving a signal responsive to the rate of turn of the craft about said axis, an auxiliary non-gyroscopic standard of position, a pick-off thereat for alternatively controlling the attitude of the craft about said major axis, and air pressure means responsive to the magnitude and direction of said signal for altering the relation of the parts of said pick-offs at both the primary and auxiliary standards of position, whereby said rate-of-turn gyroscope acts to suppress turns regardless of which standard of position is in control.

17. A system of control for aircraft comprising manual means for moving a control surface of an aircraft under normal flight conditions, alternative fluid flow automatic control means for moving said surface to urge said craft to follow a pre-selected flight path, a by-pass valve in said fluid flow means permitting automatic control, spring means normally biasing said by-pass to the closed position, said manual means having thereon means for opening said by-pass means which is brought into action by grasping said manual means thereby rendering said steering gear unresponsive to said automatic control means and easily responsive to said manual means, whereby upon release of said manual means the by-pass is closed and said automatic means assumes control of said surface.

18. A control system as claimed in claim 17, in which the fluid-flow automatic control means includes a primary gyroscopic controller, servo motors responsive to said primary controller, a rate-of-turn gyroscope responsive to the turning movements of said aircraft about a primary axis, resiliently-centralized differential pressure actuated means for deriving a damping displacement from said rate-of-turn gyroscope, means for deriving a repeat-back displacement from said servo motors, and means for applying both displacements to said primary controller.

19. An auto-recovery pilot for aircraft including automatic means for bringing the aircraft into a condition of level, straight flight regardless of heading or previous attitude, including angular rate responsive devices for limiting the rate of turn of the craft about each axis thereof, a manual controller including a changeover trip, said controller being adapted, when grasped, to control the flight of the aircraft about any axis, and means responsive to the release of said trip for transferring the control of the craft entirely to said auto-recovery pilot, whereby the craft is brought at a safe rate to straight, level flight regardless of its previous flight conditions.

20. An auto recovery pilot as claimed in claim 19, having a warning indicator also brought into action by the release of said trip.

ROBERT HAYES NISBET.
ARTHUR PHILIP GLENNY.

REFERENCES CITED

The following references are of record in the file of this patent:

UNITED STATES PATENTS

| Number | Name | Date |
|---|---|---|
| 1,015,837 | Regnard | Jan. 30, 1912 |
| 1,137,519 | Newburger | Apr. 27, 1915 |
| 1,156,760 | Curry | Oct. 12, 1915 |
| 1,187,439 | Macy | June 13, 1916 |
| 1,203,221 | Macy | Oct. 31, 1916 |
| 1,866,596 | Hendrickson | July 12, 1932 |
| 1,896,805 | Sperry et al. | Feb. 7, 1933 |
| 2,007,515 | Wunsch et al. | July 9, 1935 |
| 2,051,837 | Fischel | Aug. 25, 1936 |
| 2,086,916 | Kormann | July 13, 1937 |
| 2,144,614 | Carlson | Jan. 24, 1939 |
| 2,183,939 | Moss | Dec. 19, 1939 |
| 2,238,300 | Zand et al. | Apr. 15, 1941 |
| 2,286,561 | Meredith | June 16, 1942 |

FOREIGN PATENTS

| Number | Country | Date |
|---|---|---|
| 243,485 | Germany | Feb. 14, 1912 |
| 515,205 | Great Britain | Nov. 29, 1939 |

Certificate of Correction

Patent No. 2,439,750. April 13, 1948.

ROBERT HAYES NISBET ET AL.

It is hereby certified that errors appear in the printed specification of the above numbered patent requiring correction as follows: Column 14, line 51, claim 2, for the word "pilot" read *aircraft*; line 56, for "aircraft" read *pilot*; and that the said Letters Patent should be read with these corrections therein that the same may conform to the record of the case in the Patent Office.

Signed and sealed this 13th day of July, A. D. 1948.

[SEAL]

THOMAS F. MURPHY,
*Assistant Commissioner of Patents.*